United States Patent
Stevens

[11] Patent Number: 6,000,763
[45] Date of Patent: Dec. 14, 1999

[54] WHEEL SAFETY LOCK

[76] Inventor: Robert Stevens, R.R. #1 Box 241, Beachburg, Ontario, Canada, K0J 1C0

[21] Appl. No.: 09/012,258

[22] Filed: Jan. 23, 1998

[51] Int. Cl.$^6$ .................................................. B60B 29/00
[52] U.S. Cl. ..................................... 301/108.5; 301/105.1; 301/111; 301/124.1; 301/131
[58] Field of Search .................................. 301/105.1, 111, 301/124.1, 131, 108.5

[56] References Cited

U.S. PATENT DOCUMENTS

| | | | |
|---|---|---|---|
| 2,045,005 | 1/1936 | Whitacre . | |
| 2,619,389 | 11/1952 | James | 301/105.1 |
| 3,523,709 | 8/1970 | Heggy et al. . | |
| 3,623,761 | 11/1971 | Nadberny . | |
| 3,697,119 | 10/1972 | Van Wierst et al. . | |
| 3,741,603 | 6/1973 | McLean, Jr. . | |
| 4,004,838 | 1/1977 | Savage | 301/105.1 |
| 4,135,766 | 1/1979 | Trautloff | 301/124.1 |
| 5,190,355 | 3/1993 | Hobbie et al. | 301/105.1 |
| 5,328,252 | 7/1994 | Thompson | 301/105.1 |
| 5,584,949 | 12/1996 | Ingram | 301/105.1 |
| 5,658,053 | 8/1997 | Vencill et al. | 301/105.1 |
| 5,795,037 | 8/1998 | Hagelthorn | 301/105.1 |

FOREIGN PATENT DOCUMENTS 2204573  6/1997  Canada .

*Primary Examiner*—D. Glenn Dayoan
*Assistant Examiner*—Long Bao Nguyen
*Attorney, Agent, or Firm*—Haugen Law Firm PLLP

[57] ABSTRACT

In a dead axle wheel assembly having a hub and bearings mounted on a threaded spindle and held there by lock nuts to rotatably support a vehicle wheel, a safety lock comprising a sleeve, closed at an outer end and open at an inner end, the sleeve of a size, when in position secured to the spindle, to sit on and cover the outer end of the spindle with the sleeve's inner end spaced from it the lock nuts, and a device associated with the closed end of the sleeve to secure the sleeve to the other end of the spindle, whereby, when in position on the spindle, the inner end of the sleeve is located to obstruct the lock nuts, if they become loosened, to keep them from disassociating from the spindle. This safety lock provides a simple but effective construction for maintaining the integrity of a dead axle wheel assembly.

7 Claims, 2 Drawing Sheets

WHEEL SAFETY LOCK

BACKGROUND OF THE INVENTION

The present invention relates to a safety lock for securing the original lock nuts, hub and wheel bearings to the spindle of a dead axle trailer wheel or a dead axle tractor wheel in the event that they become loose.

These wheels have an inherent problem of coming off. The causes of this vary from poor maintenance, unsecured bearing locks, loss of oil causing bearing failure, and extreme loads causing bearing failure. In most cases, the falling off of the wheel is caused by a failed bearing or lock nuts, the lock nuts then unscrewing leaving nothing to hold the wheel on the spindle. Because of the nature of the thread on the outer end of the spindle, on which the lock nuts are fastened, the left side unscrews in forward motion and the right side unscrews during backing up.

In a reported accident resulting from bearing failure in Miami, Fla., on scene investigators concluded that the lack of maintenance, specifically proper lubrication, caused the wheel bearing to seize. They determined that the lack of grease on the wheel bearing, together with accumulated rust on the spindle and outside bearing, resulted in the following sequence:

a. The bearing progressively seized and overheated.

b. The bearing fused with the retaining washer and retaining lock nut.

c. This fused assembly started to rotate according to the forward wheel motion.

d. The lock tab on the retainer washer broke.

e. The cotter pin sheared off.

f. The fused assembly started to unscrew progressively until the complete wheel assembly became loose.

Of general background interest is Canadian Patent Application Serial No. 2,204,573 published Jun. 6, 1997, which describes and illustrates a plate secured to a hub, which bears against a portion of a wheel rim secured to the hub to prevent that rim from becoming unintentionally disassociated from the hub. U.S. Pat. Nos. 2,045,005, Whitacre; 3,523,709, Heggy et al; 3,623,761, Nadheray; 3,697,119, Van Wierst et al and 3,741,603, McLean, Jr. all describe and illustrate locking plates for axle end caps of railroad bearings, these locking plates bolted to the ends of their corresponding axles and bearing against the inner races of the bearings or associated wear rings for railway rolling stock.

SUMMARY OF THE INVENTION

The present provides a safety lock for a dead axle wheel assembly having a hub and bearings mounted on a threaded spindle and held there by lock nuts to rotatably support a vehicle wheel. The safety lock comprises a) a sleeve, closed at an outer end and open at an inner end, the sleeve of a size, when in position secured to the spindle, to sit on and cover the outer end of the spindle with the sleeve's inner end spaced from it the lock nuts; and b) means associated with the closed end of the sleeve to secure the sleeve to the other end of the spindle.

The safety lock according to the present invention is both simple to construct and easy to install. Because of its spacing from the lock nuts during normal operation, as will be described in more detail hereinafter, if the original locks become loose or if the bearing fails or seizes and attempts to unscrew the original lock nuts, the lock nuts can only unscrew the distance of this clearance. This feature allows the bearing to have extra clearance and reduces otherwise excessive heat and seizure potential. The extra wheel movement should give ample warning to the driver to enable the driver to pull over and tend to repairs.

Thus it is an object of the present invention to provide a safety lock for dead axle wheel assemblies which will reduce the likelihood of the wheel and hub becoming detached from a spindle.

BRIEF DESCRIPTION OF THE DRAWINGS

These and other advantages of the invention will become apparent upon reading the following detailed description and upon referring to the drawings in which.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE DRAWINGS

Figure 1:
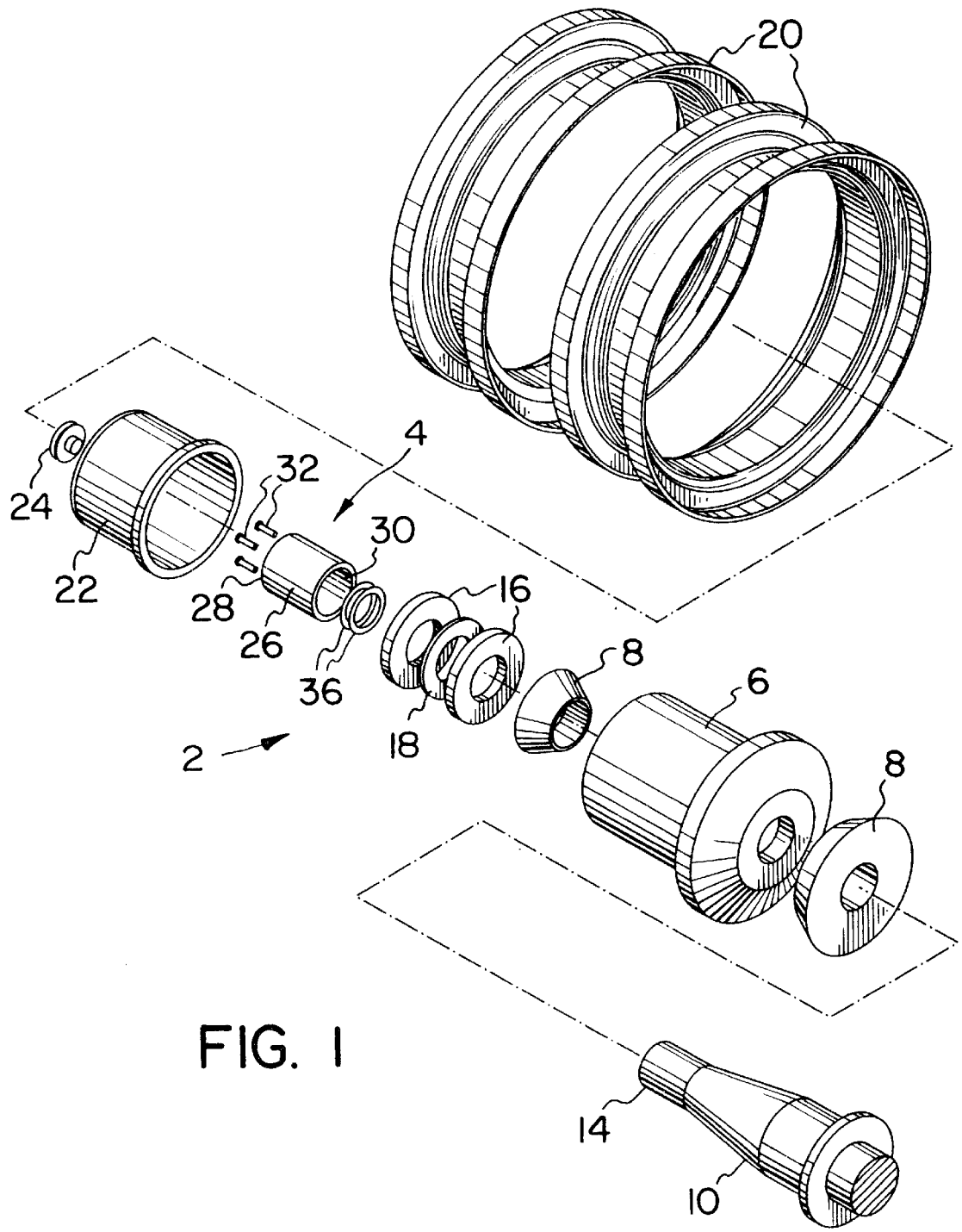
FIG. 1 is a schematic exploded perspective view of an axle wheel assembly having a safety lock in accordance with the present invention.

In the drawings similar features have been given similar reference numerals. Turning to FIG. 1 there is illustrated, in exploded fashion, a dead axle wheel assembly 2 incorporating a safety lock 4, in accordance with the present invention. The wheel assembly 2 is of conventional construction and includes a hub 6 and bearing races 8 mounted on a spindle 10, spindle 10 being at each of the outer ends of axle 12. Spindle 10 has a threaded outer end 14. Securing hub 6 and bearing races 8 in position on spindle 10 are lock nuts 16 and a locking washer 18. Rims 20 and associated wheels (not illustrated) are secured to hub 6. Oil cap 22 with oil level plug 24 is seated over outer end 14 of spindle 10 when the wheel assembly is in assembled form.

Figure 2:
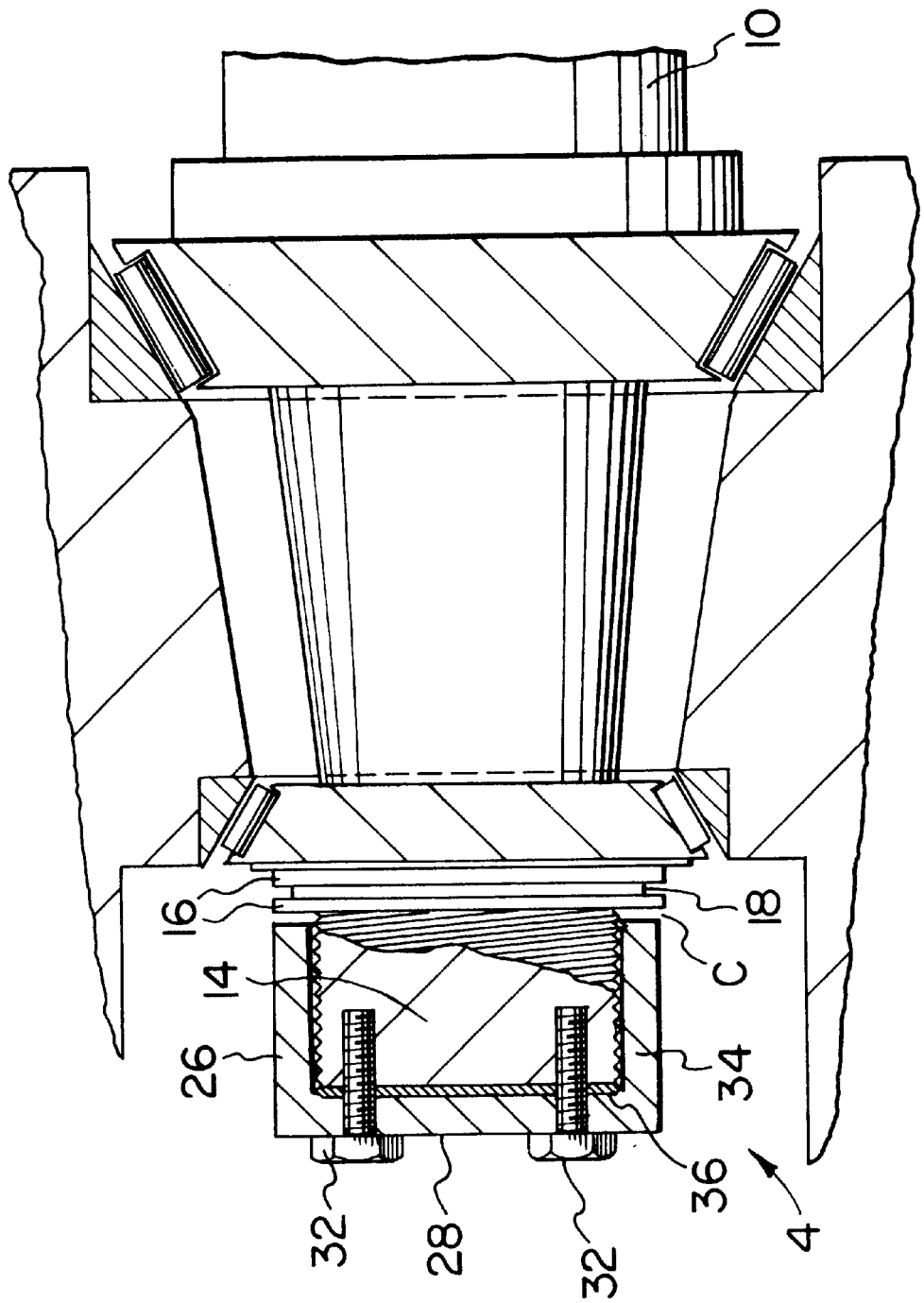
FIG. 2 is a side view, in partial section, of the lock device and wheel assembly of FIG. 1.

Safety lock 4 is in the form of a sleeve 26, preferably cylindrical, closed at its outer end 28 and open at its inner end 30. In position, it is seated over outer end 14 of spindle 10, and secured in that position by retaining bolts 32 (e.g. three ½ inch fine thread bolts). The sleeve, which is of cuplike appearance, is preferably constructed of solid bar stock. Its outer other diameter is approximately 9/16 inch larger than the diameter of outer end 14 of spindle 10. The closed outer end 28 of sleeve 26 is approximately ¼ inch thick. The bore of the sleeve 26 is preferably 1/16 inch larger in diameter than the diameter of outer end 14 of spindle 10. The wall 34 of sleeve 26 is also preferably approximately ¼ inch thick. It is seamless on all sides. One or more shims 36 are seated between the outer end 28 of sleeve 26, and the outer end 14 of spindle 10. The length of wall 34 and the thickness of shims 36 are such as to provide a clearance space C (of about ⅛ inch to about 3/16 inch between the inner end 38 of wall 34 and the confronting, outer surface of the proximal of lock nuts 16 when the safety lock 4 is in position as illustrated in FIG. 2. This clearance ensures that the safety lock 4 will not interfere with the normal operation of dead axle wheel assembly 2. If however the lock nuts 16 become loose, they can only back off a maximum of the distance of clearance C, thereby preventing the hub and associated wheel rims 20 and wheels, from falling off of spindle 10. As well, if the bearing races 8 fail or seize, and, in that condition, attempt to unscrew the original lock nuts 16, again the lock nuts can only back off clearance distance C. This feature provides two advantages. Firstly, it stops lock nuts 16 from coming off of the spindle because of the obstruction provided by the inner end of wall 36 of sleeve 26. (Sleeve 26 would normally not itself become disassociated from spindle 10, since it is secured there by retaining bolts 32.) Secondly, by enabling lock nuts 16 to back off clearance distance C, this allows more clearance for bearing races 8, thus allowing wheel rims 20 (and their associated wheels) to turn freely. This relieves much of the torsional load off of the threaded lock nuts 16 and allows them to hold the bearing races 8 in place and keep the wheel rims and associated wheels on spindle 10.

The extra lateral wheel movement caused when lock nuts 16 have backed off this clearance distance C will normal give ample warning to a driver of the vehicle to pull over and tend to repairs.

Thus there has been provided an extremely simple but effective safety lock construction for maintaining the integrity of a dead axle wheel assembly which fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. In a dead axle wheel assembly having a hub and bearings mounted on a threaded spindle and held there by lock nuts to rotatably support a vehicle wheel about the axis of said spindle, a safety lock comprising:

a) a sleeve, closed at an outer end and open at an inner end, the sleeve of a size, when in position secured to the spindle, to sit on and cover the outer end of the spindle with the sleeve's inner end spaced from the lock nuts and b) fastener means separate from the threads formed on said spindle and having axes offset from said spindle axis and associated with the closed end of the sleeve to secure the sleeve to the outer end of the spindle, whereby, when in position on the spindle, the inner end of the sleeve is located to obstruct the lock nuts, if they become loosened, to keep them from disassociating from the spindle.

2. A lock according to claim 1 wherein the sleeve is of cylindrical shape.

3. A lock according to claim 1 wherein the sleeve is secured to the outer end of the spindle by means of bolts passing through the closed end of the sleeve into the end of the spindle.

4. A lock according to claim 3 wherein the bolts are anchor bolts.

5. A lock according to claim 1 wherein the sleeve, when in position secured to the spindle, provides a clearance space between the inner end of the sleeve and a confronting surface of an outer lock nut, of from about $\frac{1}{8}$ inch to about $\frac{3}{16}$ inch.

6. A lock according to claim 1 wherein said fastener means comprises bolts having axes disposed in generally parallel relationship to said spindle axis.

7. A lock according to claim 1 wherein said fastener means comprise a plurality of bolts having axes parallel to and offset from said spindle axis.

* * * * *